United States Patent [19]

Heusler et al.

[11] 4,235,327

[45] Nov. 25, 1980

[54] ESCALATOR WITH DRIVER DEVICE FOR CARRYING OF TRANSPORTATION CARTS

[75] Inventors: Helmut Heusler; Bruno Kiefer, both of Dortmund, Fed. Rep. of Germany

[73] Assignee: O&K Orenstein & Koppel Aktiengesellschaft, Berlin, Fed. Rep. of Germany

[21] Appl. No.: 11,286

[22] Filed: Feb. 12, 1979

[30] Foreign Application Priority Data

Mar. 4, 1978 [DE] Fed. Rep. of Germany ....... 2809435

[51] Int. Cl.³ ........................ B62B 5/02; B65G 17/46; B66B 9/12

[52] U.S. Cl. .................................................... 198/326

[58] Field of Search ........................ 198/321, 326-333, 198/836; 186/1 AE; 104/25

[56] References Cited

FOREIGN PATENT DOCUMENTS

| | | | |
|---|---|---|---|
| 2719394 | 11/1978 | Fed. Rep. of Germany | 198/333 |
| 2242314 | 3/1975 | France | 198/321 |
| 1217098 | 12/1970 | United Kingdom | 198/326 |

*Primary Examiner*—Jeffrey V. Nase
*Attorney, Agent, or Firm*—Martin A. Farber

[57] ABSTRACT

Escalator with driver device for carrying of transportation carts on the escalator steps. The transportation carts are secured against rolling down the escalator steps by a carrying and abutment device, which device is arranged on both sides of the transportation carts along the balustrades.

8 Claims, 6 Drawing Figures

ESCALATOR WITH DRIVER DEVICE FOR CARRYING OF TRANSPORTATION CARTS

The invention relates to an escalator with driver device for carrying of transportation carts, particularly trunk wagons on the escalator steps.

A known device for the transportation of purchasing carts between the floors of multi-storied department stores (German Pat. No. 1 919 740) has running rails (running at different height) for the front and rear wheel pairs of the purchasing carts (which wheel pairs have different wheel spacings) as well as driven conveyor chains or conveyor belts (which are equipped with drivers) for carrying along or driving the purchasing carts. Since this known arrangement does not rely on escalators, a complete transportation system is necessary with its own or self drive and corresponding spacial requirement, which because of this is costly and mostly is hard to combine with the given spacial conditions. Beyond that the person who carries the purchasing cart must part or separate from this in order then to receive it again at the other end of the conveyor means. With crowds of people complications arise in this manner as a consequence of mutual obstruction so that the people can no longer receive their purchasing carts ordered.

The invention is based on the task to create a transportation device for transportation carts, trunk wagons, purchasing carts, etc., particularly for the given conditions of airports, which adjusts itself completely to the escalator, requires no special drive, has a favorable spacial need and offers the possibility that the users no longer need to separate from their transport cart.

It is another object of the present invention to aid in the solution of the above-mentioned object in the manner that the transportation cart (11) is secured against rolling off the escalator steps (10) by means of a carrying and abutment device (16, 17, 18 and 20, respectively) which device is arranged on both sides of the transportation carts (11) along the balustrades (14).

On each side of the transportation carts (11) which are carried along by the escalator steps (10) there is rigidly arranged a roller axle (13) penetrating through longitudinal slots (15) which are arranged in the balustrades (14), a guide roller (16) being mounted on the free end of the axle, the guide rollers being constrained between guides (17, 18), the latter being arranged inside of the balustrades (14) on the longitudinal sides of the latter.

The advantage of the invention is that for driving or carrying along the transportation carts (which are suited for the transportation e.g. of baggage on escalators) on a series stairs, only little changes must be provided since a self-propelled or self-driven device is not necessary.

Further in accordance with the invention on each escalator step (10) there is fastened a hinged detent locking lever (20) which is bent at an obtuse angle, the detent lever (20) holding the transportation cart (11) after running against the escalator steps (10) by means of the free end which projects laterally beyond the rollers (25) and securing the transportation cart against rolling down and tipping, respectively.

Still further in accordance with the invention angular-shaped bent guard plates (14*b*) are fastened to the base sheets (23, 24), the guard plates covering the rollers (25) of the transportation cart (11).

Yet further by the invention endless rotating chains (30 or 40) arranged parallel to the constrained or forced guides (44, 45) are operatively guided on the latter, the constrained guides being arranged inside of the balustrades (14), the links of the chains (30 or 40) are provided with abutments (31 or 41), on which abutments the extended axles (32 or 42) of the rollers (50 or 43) abut.

With the above and other objects and advantages in view, the present invention will become more clearly understood in connection with the detailed description of a preferred embodiment, when considered with the accompanying drawings, of which:

Figure 1:
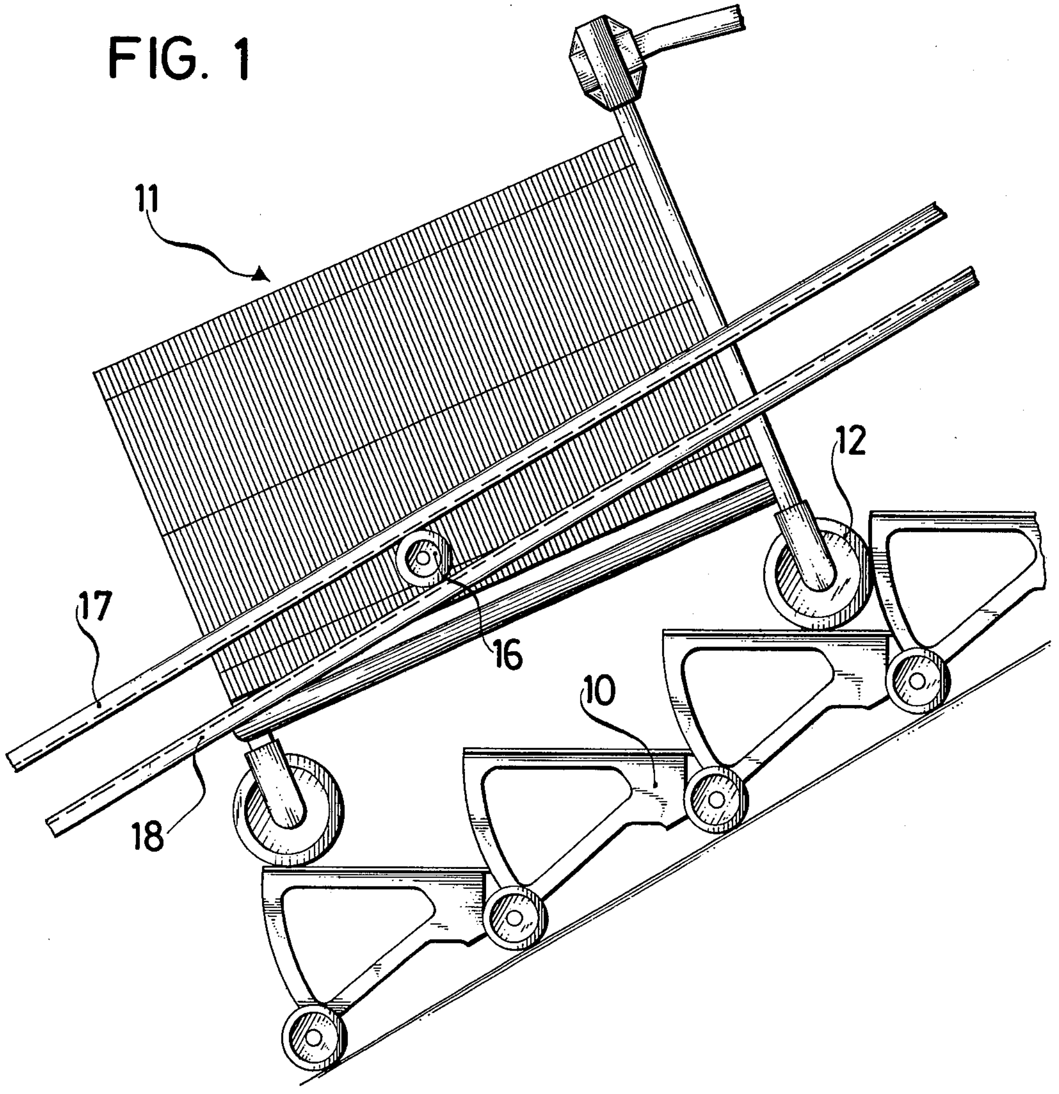
FIG. 1 is a side view of a restraint or forced or constrained guide according to a first embodiment.

Referring now to the drawings, the transportation cart 11 is carried along on the escalator steps 10 of an escalator (FIGS. 1 and 2), which cart stands with its rollers 12 on the escalator steps 10. In the lower third of the transportation cart 11 axles 13 are rigidly mounted sidewise cross to the direction of travel. The axles 13 grip through the longitudinal slot 15 which is provided on the entire length of the balustrades 14. Guide rollers 16 are rotatably mounted on the free ends of the axles 13. The guide rollers are guided between the guides 17 and 18, the latter being formed from U-irons. Since the guides 17 and 18, which are fixed and mounted parallel to the balustrade 14, have an inclination which is different compared to the stepping plates of the escalator steps 10, consequently by means of the guides 17 and 18 the transportation cart 11 which stands on the escalator steps 10 is prevented from rolling down from the steps. Furthermore even a tipping or tilting of the transportation cart is prevented.

Figure 3:
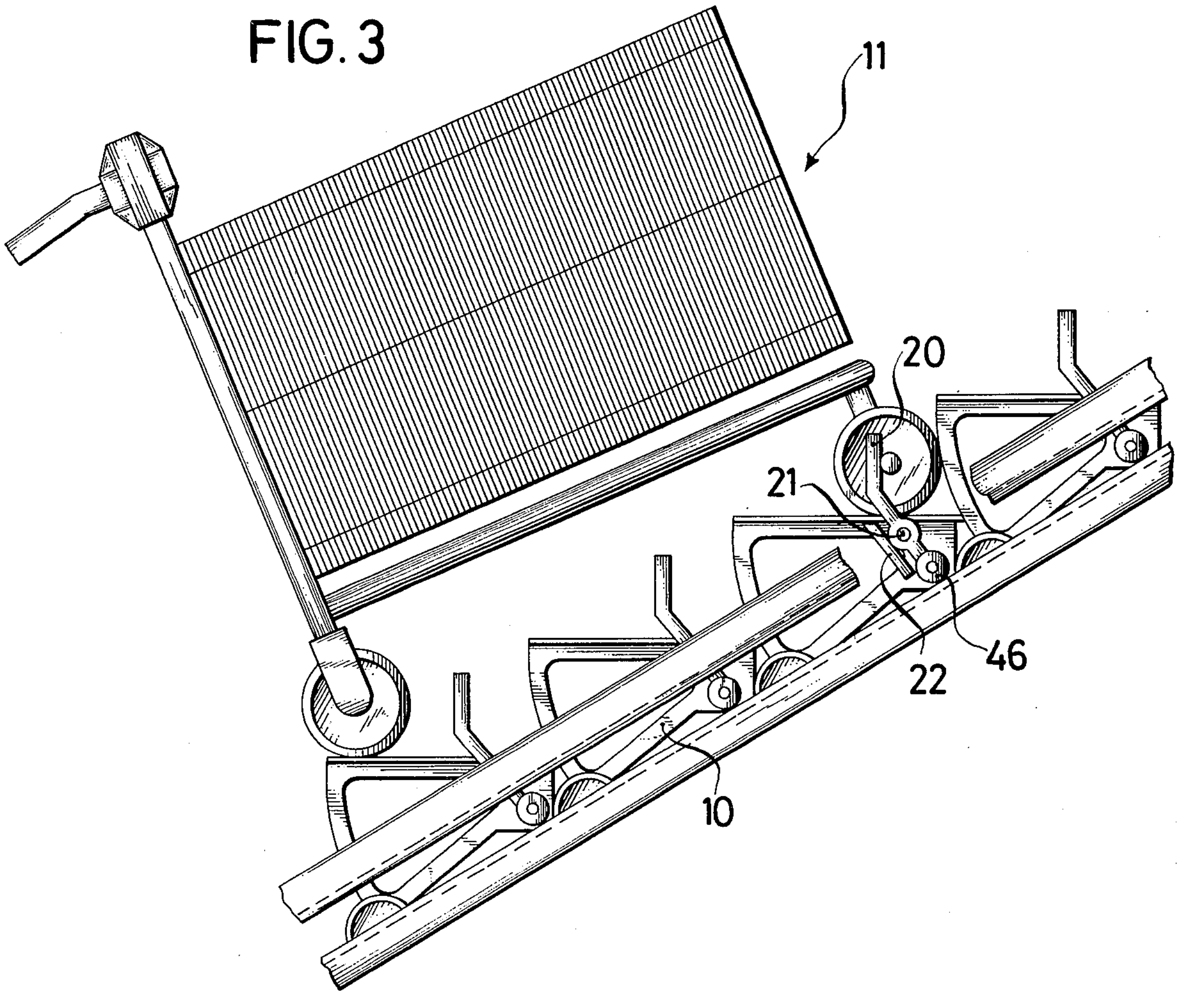
FIG. 3 is a side view of a guide- and carrying- device according to another embodiment.
Figure 4:
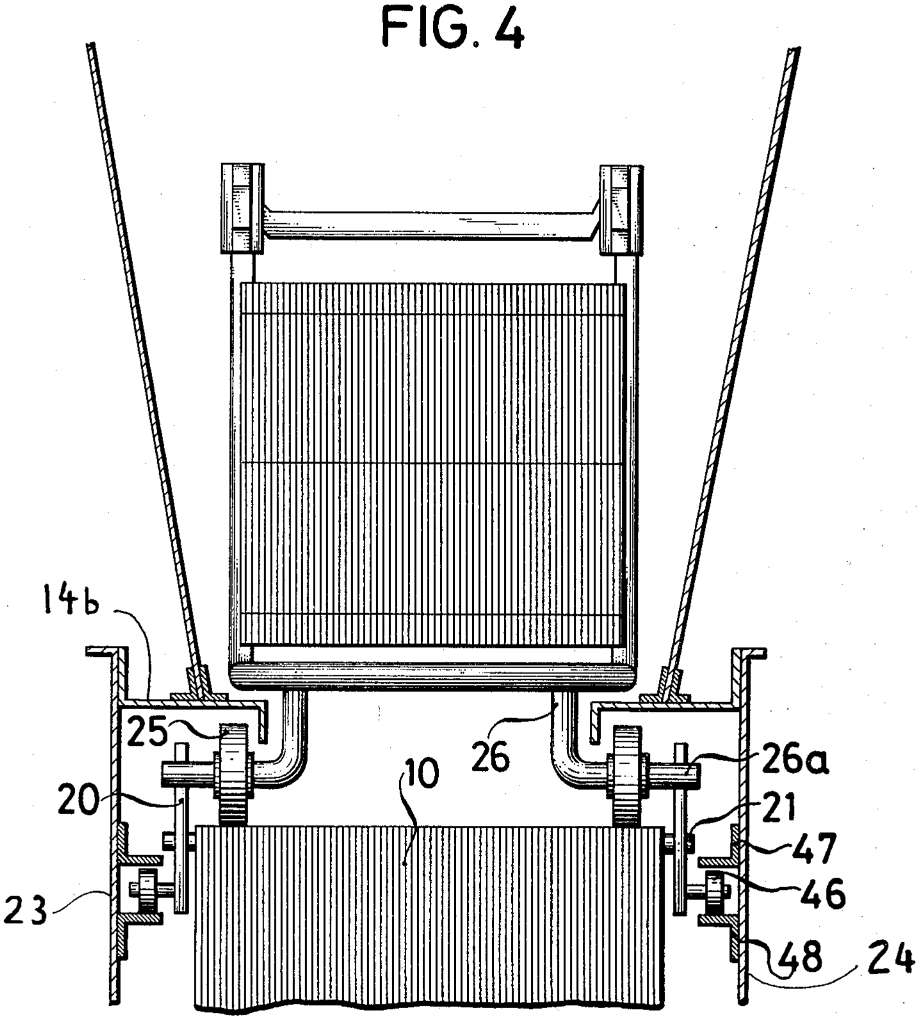
FIG. 4 is a section through the embodiment according to FIG. 3, from which the arrangement of the carrying metal sheet is shown.

With the embodiment according to FIGS. 3 and 4 detent or stop levers 20, which are bent at an obtuse angle, are arranged on the escalator steps 10. The levers are pivotable about the pivot point 21 and a guide roller 46 is arranged on one of their free ends. By means of the angle irons 47 and 48 which form a guide for the rollers 46, which angle irons are arranged along the escalator step conveyor on lateral base walls, the stop levers 20 are rotated about their axes or turned at the end of the escalator. For carrying along or driving the transportation carts 11 during the upward and downward movement of the escalator, the detent locking lever 20 lies against an abutment 22 which is connected to the steps 10, so that when the transportation cart 11 rolls against the abutment, it prevents the rolling down of the transportation car from the escalator step. So that the transportation cart 11 cannot tilt, the base plates 23 and 24 are mounted on the balastrades 14 along the path of travel of the stairs. The rollers 25 are rotatably mounted on the angularly bent axles 26, so that the detent locking levers 20 engage behind and retain the free ends 26*a* of the axles 26 in the holding and carrying position during up and down movement on the escalator as illustrated in FIGS. 3 and 4.

Figure 2:
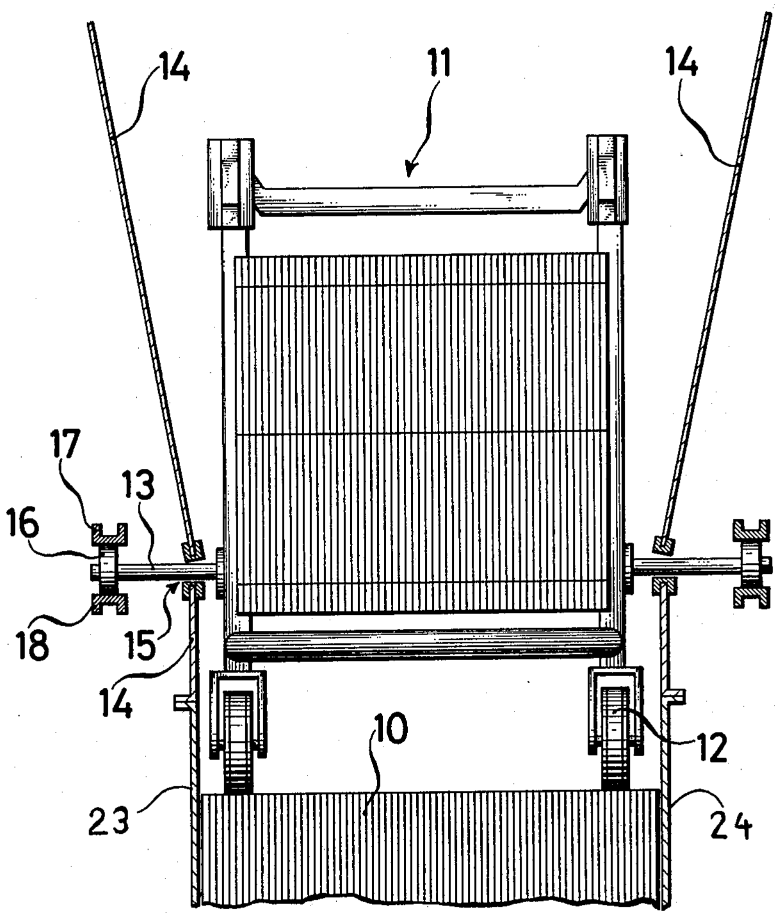
FIG. 2 is a cross-section through a guide device according to FIG. 1.
Figure 5:
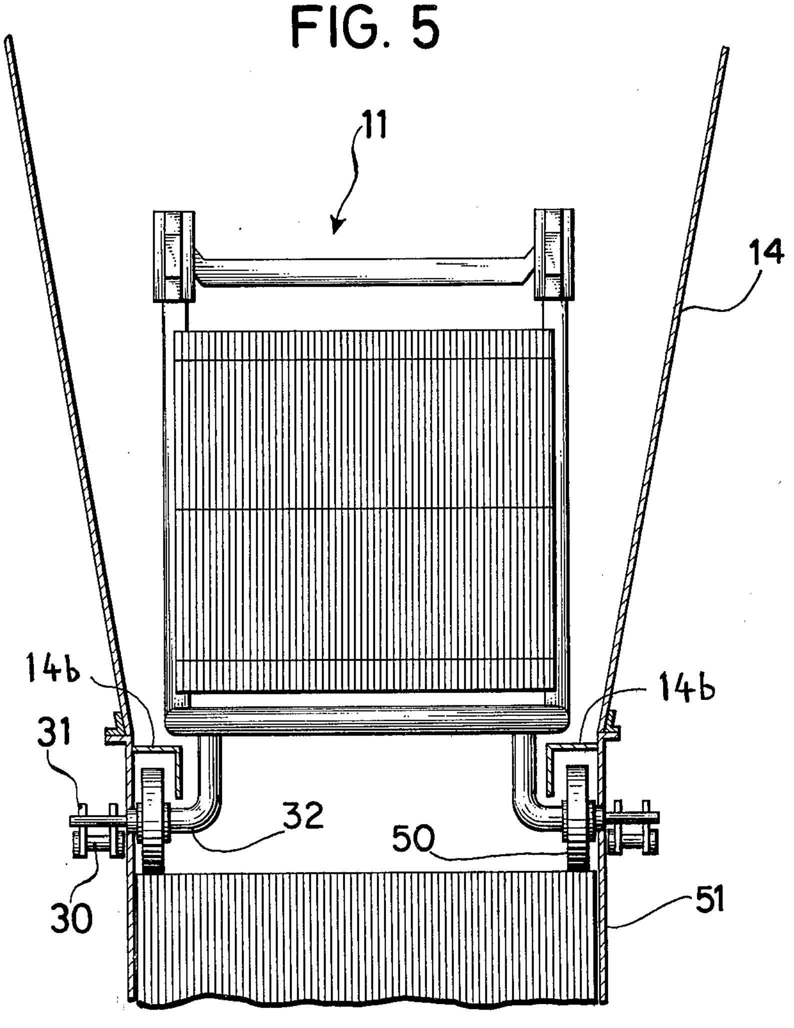
FIG. 5 is a cross-section through another arrangement.
Figure 6:
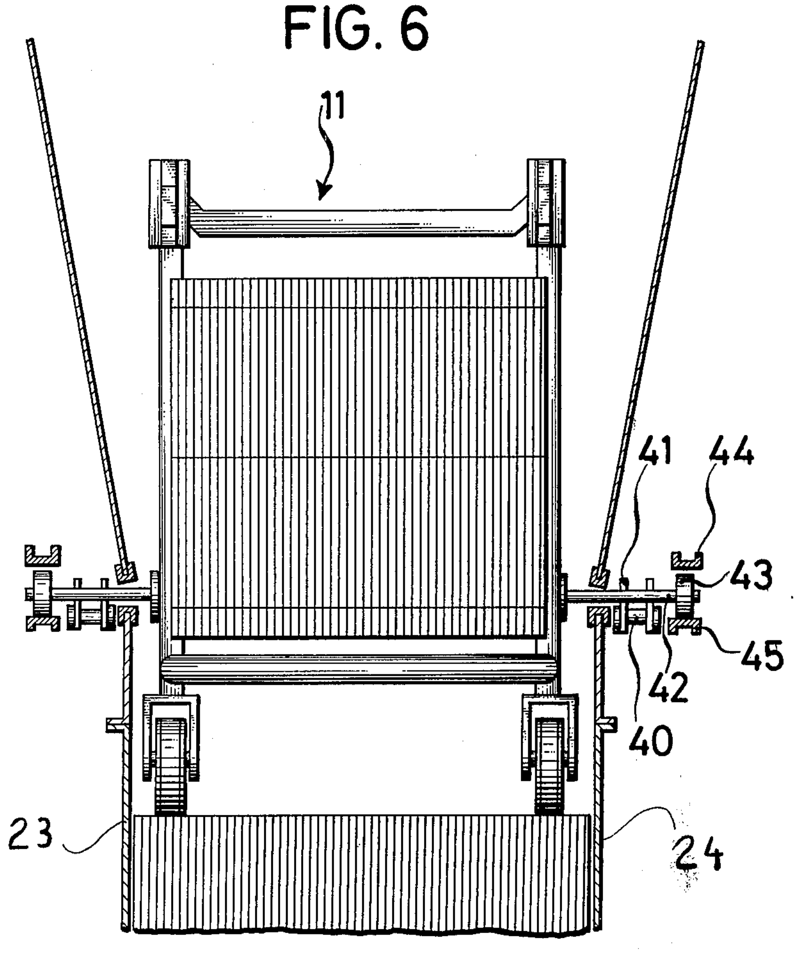
FIG. 6 is a modified embodiment of FIG. 5.

A variant of the guide device according to FIGS. 1 and 2 is illustrated in FIGS. 5 and 6. The guiding of the transportation carts 11 takes place according to FIG. 5 by means of endless rotating chains 30 which rotate inside of the balastrade. The chain 30 is provided with abutments 31. The chain 30 with the abutments 31 engages behind and retains the corresponding narrowed free end of the axle 32 of the transportation cart 11, which cart, as with the previously described embodiments, is carried on the escalator steps supported. Here the cart 11 is supported on the escalator steps via rollers 50 mounted on the angularly bent axles 32. The narrowed free ends of the axles 32 extend through elongated openings in the side walls 51 adjacent the escalator steps. L-shaped angle members **14*b* mounted at the top of these side walls form channels for the rollers 50**.

With the embodiment according to FIG. 6 endless rotating chains 40 which are provided with abutments 41 engage on the axle 42 which is fixed to the cart 11 and extends laterally therefrom through elongated openings in the balustrades. Moreover, the axles 42 on their free ends rotatably carry rollers 43, respectively. The rollers 43 are guided between restraints or constrained guides 44 and 45 constituting U-shaped angle members facing away from one another.

The chains 30 and 40 of FIGS. 5 and 6 are operatively connected to the escalator so as to be driven thereby.

While there has been disclosed several embodiments of the invention, it is to be understood that these embodiments are given by example only and not in a limiting sense.

We claim:

1. An escalator having balustrades and with a driver device for carrying of transportation carts, particularly trunk wagons on escalator steps, comprising means for securing the transportation cart against rolling off the escalator steps, said means comprising a carrying and abutment device is arranged on both sides of the transportation cart along the balustrades, a transportation cart, an axles rigidly connected to and on each side of said transportation cart, said means is for carrying said transportation cart along in cooperation with the escalator steps, said axles penetrate through longitudinal slots formed in the balustrades, respectively, said means includes guide rollers mounted on free ends of said axles, respectively, said means further includes guide means for constraining said guide rollers therebetween, said guide means being mounted inside of the balustrades on the longitudinal sides of the latter.

2. The escalator as set forth in claim 1, wherein said guide means on each side constitutes two guide rails spaced from one another by the diameter of said guide rollers, said guide rails have a different inclination than stepping surfaces of the escalator steps.

3. An escalator having balustrades and with a driver device for carrying of transportation carts, particularly trunk wagons on escalator steps, comprising means for securing the transportation cart against rolling off the escalator steps, said means comprising a carrying and abutment device is arranged on both sides of the transportation cart along the balustrades, an axle rigidly connected to said transportation cart and extending to each side thereof, said carrying and abutment device includes, rollers mounted on free ends of said axles, respectively, a locking lever pivotally mounted on each escalator step, said locking lever is bent at an obtuse angle, said lever holds the transportation cart after running against the escalator steps via the free ends of said axles, said free ends project laterally beyond said rollers, said lever securing the transportation cart against rolling down and tilting, respectively,

4. The escalator as set forth in claim 3, wherein said carrying and abutment device further includes, guide rollers mounted on a lower end of said locking lever, lateral base walls adjacent the sides of the escalator steps and connected to the balustrades, guide means for constraining said guide rollers therebetween, said guide means are mounted on said lateral base walls, an abutment member is connected to the escalator steps, said locking lever engaging said abutment member when said locking lever via an upper end thereof engages the free ends of said axles of the transportation cart.

5. An escalator having balustrades and with a driver device for carrying of transportation carts, particularly trunk wagons on escalator steps, comprising means for securing the transportation cart against rolling off the escalator steps, said means comprising a carrying and abutment device is arranged on both sides of the transportation cart along the balustrades, said means comprising the carrying and abutment device includes, endless rotating chains, said chains are arranged inside of the balustrades, said chains comprise links, abutments mounted on said links, axles extend from the transportation cart, rollers are mounted on said axles, said abutments engage said axles.

6. The escalator as set forth in claim 5, wherein said axles are extended beyond said rollers defining free ends, said abutments engage said free ends of said axles, said free ends of said axles extend into said balustrades.

7. The escalator as set forth in claim 3 or 6, further comprising base plates of the balustrades, angularly-shaped guard plates are fastened to said base plates, the guard plates cover said rollers of the transportation cart.

8. The escalator as set forth in claim 5, wherein said axles penetrate through longitudinal slots formed in the balustrades, respectively, said rollers are mounted on free ends of said axles, respectively, said means further includes guide means for constraining said rollers therebetween, said guide means being mounted inside of the balastrades, said axles are rigidly connected to each side of said transportation cart.

* * * * *